Sept. 23, 1952     J. M. WILSON     2,611,171
MOLD FOR MOLDING CONCRETE TIES
Filed Feb. 27, 1950

Inventor:
JOHN MILLAR WILSON
By
Richardson, David and Nordon
Attorneys

Patented Sept. 23, 1952

2,611,171

UNITED STATES PATENT OFFICE 2,611,171

MOLD FOR MOLDING CONCRETE TIES

John M. Wilson, Glasgow, Scotland

Application February 27, 1950, Serial No. 146,425
In Great Britain February 26, 1949

3 Claims. (Cl. 25—121)

This invention relates to a mould for moulding of concrete ties and like units (hereinafter and in the claims referred to simply as "concrete ties"), and is especially applicable to a mould for moulding of ties used in the manufacture of hollow concrete blocks having two spaced walls tied together by said ties. These blocks are commonly but not exclusively used in the building trade.

In accordance with the present invention I provide a composite multiple mould for moulding concrete ties comprising a bottom having a plurality of spaced rearwardly-extending grooves therein, a longitudinal rear plate disposed substantially at right angles to said bottom plate and provided with a series of recesses on its front and spaced correspondingly to said grooves, a plurality of transverse dividing plates each adapted for positioning with its lower edge engaging in one of said grooves and its rear end engaging in the corresponding recess of the rear plate, a longitudinal front plate disposed substantially at right angles to said bottom plate and facing said rear plate, and means for detachably clamping the front and rear plates together to lock the whole mould in assembled relationship without additional clamping or retaining means, thus enabling quick and easy assembly and dismantling of the mould.

Preferably a plurality of longitudinal row dividing plates are provided, each having a series of recesses on its front spaced correspondingly to said grooves in the bottom plate, said longitudinal row dividing plates being each adapted for positioning intermediate said front and rear plates between two rows of transverse dividing plates, whereby a plurality of rows of individual tie moulds may be quickly and easily assembled together.

The transverse dividing plates are preferably each provided with a kink intermediate its length whereby a transverse groove or recess is formed in each of the ties intermediate its length for the purpose of collecting moisture and allowing the accumulated water to drip, when the ties are positioned between the walls of a double wall.

The invention will now be described, by way of example, with reference to the accompanying drawing, in which.

Figure 1:
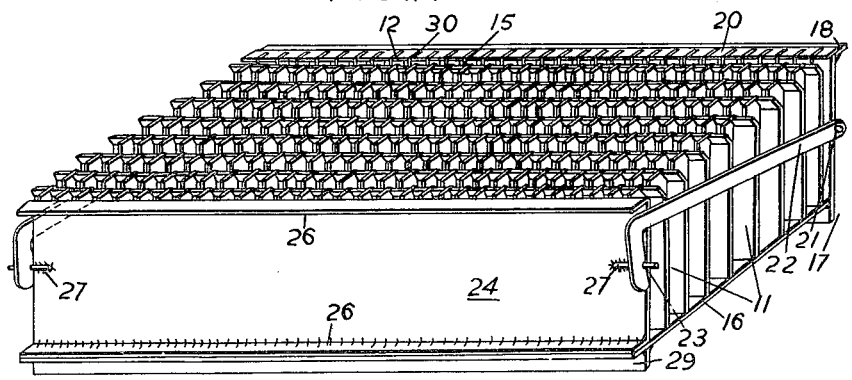
Fig. 1 is a perspective view, from above and to one side, of a composite multiple mould for moulding concrete ties.
Figure 2:
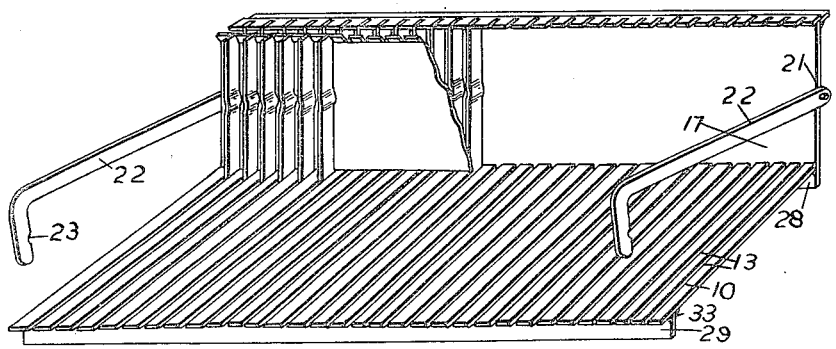
Fig. 2 is a perspective view, from above and to the front of the combined bottom and rear plate unit of the mould showing several transverse dividing plates and a layer dividing plate in their assembled positions, part of the layer dividing plate being broken away.
Figure 3:
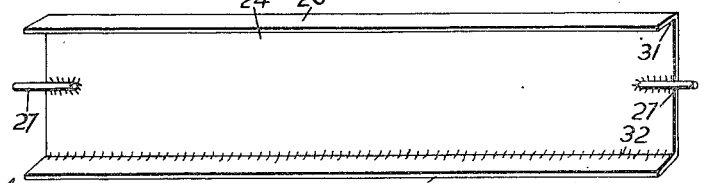
Fig. 3 is a top perspective view of the front plate of the mould.
Figure 4:
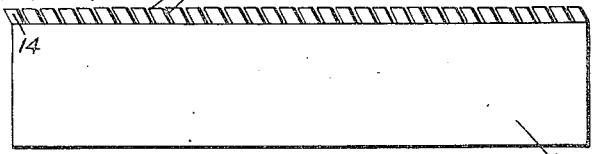
Fig. 4 is a perspective view of a longitudinal row dividing plate of the mould.
Figure 5:
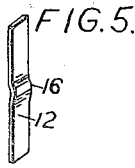
Fig. 5 is a perspective view of a transverse dividing plate of the mould.
Figure 6:
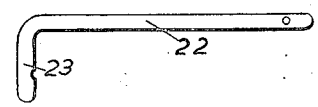
Fig. 6 is an elevation of a clamp arm.
Figure 7:
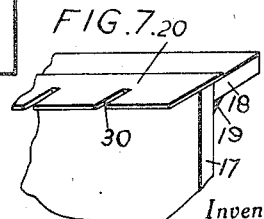
Fig. 7 is a perspective detail view on a larger scale showing the upper part of the rear plate of the mould.

Referring to the drawing, the composite multiple mould comprises a rectangular, bottom plate 10 of metal in the surface of which a plurality of grooves or recesses 13 are machined. The recesses 13 are equi-spaced and are parallel to one another and to the sides of the bottom plate. A longitudinal rectangular rear plate 17 of metal, of the same length as the bottom plates 10 is fixed in position relative to the bottom plate so that the surfaces of said two plates are vertical to one another. The plates 10 and 17 are welded together and a part 28 of the rear plate projects below the bottom plate to space the latter from ground level. A longitudinal supporting strip 29 of depth equivalent to the part 28 of the rear plate is welded as shown at 33 to the under surface of the bottom plate near the front edge thereof. A horizontal strip or flange element 18 of metal is welded at 19 into position on the outer side of the rear plate with its top surface on a level with the upper edge of the rear plate, and a horizontal plate 20 is welded to the upper surface of the strip 18 and the upper edge of the rear plate. The plate 20 projects inwardly from the rear plate 17 and a series of open-ended recesses or slots 30 are provided, being milled in the inwardly projecting part. The slots 30 are parallel to one another, and are spaced similarly to and positioned vertically above the grooves 13 in the bottom plate 10.

A pin 21 is welded into position at each end of the rear plate 17 intermediate the height of the latter and an L-shaped clamp arm 22, having a semi-circular notch 23 in the upper surface of the base of the L, is pivotally mounted on said pin.

A longitudinal rectangular front plate 24 of metal is provided and has horizontal flanges 26 welded into position along its upper and lower edges as shown at 31 and 32. Pins 27 are welded into position on each end of the front plate intermediate its height. The pins 27 are on the same side of the plate 27 as the flanges 26.

A plurality of rectangular, longitudinal, row dividing plates 11 are provided. The upper edge 14 of each plate 11 is bent over at an angle to the plane of the plate and a series of open-ended recesses or slots 15 are provided in the part 14, said recesses 15 being parallel and spaced similarly to the grooves 13 in the bottom plate 10.

A plurality of transverse dividing plates are provided and each comprises a rectangular metal strip 12 having a kink 16 intermediate its length. The bottom plate 10, the rear plate 17, the front plate 24, and the row dividing plates 11 are equal in length, and that part of the rear plate projecting above the bottom plate is substantially equal in height to or a little greater in height than the plates 12 which in turn are a little greater in height than the plates 11.

In a specific example the bottom plate measures 3 feet by 12 inches, the rear plate measures 3 feet by 9 inches (one inch of which is below the bottom plate), the row dividing plates measure 3 feet by 7 inches, and the transverse dividing plates measure 7½ inches by 1 inch.

The various members of the mould are preferably formed from bright steel of suitable gauge. The two series of dividing plates may, for example, be of 14 gauge, while the other parts may be from ¼" to ⅛" thick.

In assembling the mould, the composite member comprising the grooved bottom plate 10 and the rear plate 17 is laid in a rearwardly inclined position. A row or series of transverse dividing plates 12 is then inserted into the grooves 13 in the bottom plate 10 with the tops of the plates held in position by the rear parts thereof engaging in the corresponding recesses in the plate 20. The plates 12 are positioned with the kinks 16 all lying in the same direction. The plates 12 are vertical to both bottom and rear plates 10 and 17 when in position.

After one row of transverse dividing plates 12 are in position, a longitudinal row dividing plate 11 is laid in position across the forward edges of the row of plates 12, the bent-over part 14 of the plate 11 projecting forwardly away from the row of plates 12. A further row of transverse dividing plates 12 is then placed in position with the lower edges thereof engaging in the grooves 13 in the bottom plate 10 and the rear parts of the tops thereof engaging in the corresponding recesses 15 in the row dividing plate 11. A further row dividing plate 11 is then placed in position and a further row or series of transverse dividing plates 12 are positioned thereadjacent and so on until, in the present example, ten rows of plates 12 and nine plates 11 have been placed in position. The front plate 24 is laid across the final row of plates 12 with its flanges 26 outwards, the lower flange resting on the bottom plate 10. The clamp arms 32 are then forced over the pins 27 on the front plate, said pins being engaged by the notches 23 in the clamp arms.

In the moulding operation, the composite mould is placed on a vibrating platform to facilitate packing of the individual moulds, which are of relatively small cross-section, and the moulds are filled up with concrete. A steel rod reinforcing member is inserted longitudinally into each tie after the moulds are filled. The concrete is then allowed to set.

When the concrete has set the composite mould is turned over to rest on the rear plate 17 and the clamp arms 22 are disengaged from the front plate 24. The front plate is then removed and the rows of ties are removed row by row, the row dividing plates acting as trays. The transverse dividing plates are then removed and the rows of ties are stored away for curing.

In the present example, the composite mould consists of ten rows, each of thirty individual tie moulds, thus giving three hundred ties per mould. This number may, of course, be increased or decreased as desired.

The multiple mould of the present invention is especially suitable for mass production of ties. The mould is readily assembled and dismantled, and the removal of the ties row by row after setting greatly speeds up final curing thereof.

The kink or transverse groove formed in the ties moulded in the mould provides a recess in which moisture can accumulate and from which the water will drop when the tie is in position in a double wall.

I claim:

1. A composite multiple mould for moulding concrete ties comprising a bottom having a plurality of spaced, parallel, rearwardly-extending grooves therein, a longitudinal rear plate disposed substantially at right angles to said bottom plate and fixed relative thereto, a flange element projecting inwardly from the upper edge of said rear plate and provided with a series of recesses which are spaced correspondingly to and are in vertical alignment with said grooves, a first row of transverse dividing plates each of which is positioned with its lower edge engaging in one of said grooves and its rear edge engaging in the corresponding recess of the flange element, a plurality of spaced longitudinal row dividing plates disposed substantially at right angles to said bottom and parallel to said rear plate, each of said row dividing plates being bent over adjacent its upper edge in the direction away from the rear plate, and having a series of recesses in said bent over part which are spaced correspondingly to and are in vertical alignment with said grooves, a plurality of successive rows of transverse dividing plates each disposed between adjacent row dividing plates with the lower edge of each plate of each row engaging in one of said grooves and the rear edge thereof engaging in the corresponding recess of a longitudinal row dividing plate, a longitudinal front plate disposed substantially at right angles to said bottom plate and facing said rear plate, and means releasably clamping said front and rear plates together to lock the transverse dividing plates and row dividing plates in the assembled position.

2. A composite multiple mould as claimed in claim 1, in which the transverse dividing plates of each row have each a kink intermediate its length which forms a depression in one surface of the plate and a corresponding projection on the opposite surface thereof, the kinks in each row of plates being identical in shape and at the same level and facing in the same direction.

3. A composite multiple mould as claimed in claim 2, in which the releasable clamping means comprises a pin at each end of the front plate and projecting outwardly therefrom and a pivotally-mounted clamping arm at each end of the rear plate engaging the pin projecting from the corresponding end of the front plate.

JOHN M. WILSON.

REFERENCES CITED

The following references are of record in the file of this patent:

UNITED STATES PATENTS

| Number | Name | Date |
| --- | --- | --- |
| 785,636 | Sawyer | Mar. 21, 1905 |
| 893,501 | Huber | July 14, 1908 |
| 1,268,676 | Bunker | June 4, 1918 |
| 1,281,405 | Marquess | Oct. 15, 1918 |
| 1,326,246 | Young | Dec. 30, 1919 |
| 1,430,763 | Sivertson | Oct. 3, 1922 |
| 1,597,163 | Krump | Aug. 24, 1926 |
| 1,897,792 | Crowell | Feb. 14, 1933 |
| 2,170,936 | Baron | Aug. 29, 1939 |